United States Patent [19]

Morikawa

[11] 4,426,864
[45] Jan. 24, 1984

[54] CYLINDER LOCK

[75] Inventor: Minoru Morikawa, Nagoya, Japan

[73] Assignee: Kabushiki Kaisha Tokai Rika Denki Seisakusho, Aichi, Japan

[21] Appl. No.: 310,366

[22] Filed: Oct. 9, 1981

[30] Foreign Application Priority Data

Oct. 13, 1980 [JP] Japan .......................... 55-146273[U]

[51] Int. Cl.³ ...................... E05B 17/00; E05B 33/00; E05B 47/00
[52] U.S. Cl. ........................................ 70/431; 70/279; 70/364 R; 70/391
[58] Field of Search ................. 70/431, 434, 320, 372, 70/391, 277, 279, 349, 364 A, 364 R

[56] References Cited

U.S. PATENT DOCUMENTS

| 1,476,841 | 12/1923 | Raymond | 70/364 R |
| 2,061,638 | 11/1936 | Segal | 70/372 |
| 2,879,658 | 3/1959 | Johnstone | 70/364 R |
| 3,241,344 | 3/1966 | Peters . | |
| 3,304,755 | 2/1967 | Johnstone | 70/279 |
| 3,670,538 | 6/1972 | Curry | 70/277 X |
| 3,705,507 | 12/1972 | Sanders et al. | 70/434 X |
| 3,894,417 | 7/1975 | Taniyama | 70/277 X |

FOREIGN PATENT DOCUMENTS

| 2704478 | 8/1978 | Denmark | 70/364 R |
| 2922890 | 12/1979 | Denmark | 70/431 |
| 2450930 | 11/1980 | France | 70/431 |
| 657385 | 9/1951 | United Kingdom | 70/364 R |
| 2071197 | 9/1981 | United Kingdom | 70/277 |

Primary Examiner—Gary L. Smith
Assistant Examiner—Lloyd A. Gall
Attorney, Agent, or Firm—Wenderoth, Lind & Ponack

[57] ABSTRACT

A cylinder lock including a rotor casing formed with a groove and an elongated through-opening, a rotor rotatably received in the rotor casing, tumblers which are respectively formed with projecting ends engageable with the groove and slidably fitted into the rotor, a tumbler blocking member slidably inserted into the elongated through-opening, a plunger and a plunger driving device. By the above arrangement, the cylinder lock can be positively unlocked either by using a key or without using the key and instead using the plunger driving device and driving the tumbler blocking member.

6 Claims, 3 Drawing Figures

CYLINDER LOCK

BACKGROUND OF THE INVENTION

The present invention generally relates to a lock and more particularly to a cylinder lock for use in steering shaft locking devices or trunks of motor vehicles and the like which can be unlocked by predetermined operations without using a key as well as unlocking by using the key.

Recently, various cylinder locks of the above described type have been proposed for employment in the field of the motor vehicle industry, but such conventional cylinder locks are generally complicated in structure. Therefore, such known cylinder locks have posed various problems in production and operational reliability.

SUMMARY OF THE INVENTION

Accordingly, an essential object of the present invention is to provide an improved cylinder lock for use in steering shaft locking devices or trunks of motor vehicles and the like which can be unlocked by a predetermined operation without using a key in addition to being able to be unlocked by using the key, which substantially eliminates the disadvantages which conventional cylinder locks of this kind have.

Another important object of the present invention is to provide an improved cylinder lock of the above described type which is simple in structure, highly reliable in actual use, suitable for mass production at low cost, and can be readily incorporated into steering shaft locking devices or trunks of motor vehicles and the like at low cost.

In accomplishing these and other objects according to one preferred embodiment of the present invention, there is provided an improved cylinder lock comprising a rotor casing non-rotatably provided in a structure, for example the housing of a steering shaft locking device of a motor vehicle, a rotor which has a knob fixedly provided on the outer end of the rotor and is rotatably received in the rotor casing, tumblers fitted into the rotor slidable in the radial direction of the rotor, each having one end projecting for locking and unlocking of the lock through its engagement with and disengagement from one of a plurality of corresponding grooves formed in the rotor in the axial direction so as to confront each other, a tumbler blocking member inserted into an elongated through-opening which is formed in a side wall of the rotor casing in the axial direction of the rotor casing, and a solenoid having a plunger in contact with the tumbler blocking member, and which is mounted in a predetermined position on the outer circumference of the housing of the steering shaft locking device. The solenoid is connected, through a switch, to a power source.

In accordance with the present invention, the cylinder lock can be positively unlocked either by using a key by insertion of the key into a key hole formed in the rotor so as to bias the tumblers into their neutral position so that the rotor can be rotated in a predetermined direction, or, without using the key, by the simplified arrangement in which the plunger of the solenoid is thrust towards the tumbler blocking member by turning ON of the switch so as to bias the tumblers into their neutral position by the resultant movement of the tumbler blocking member.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
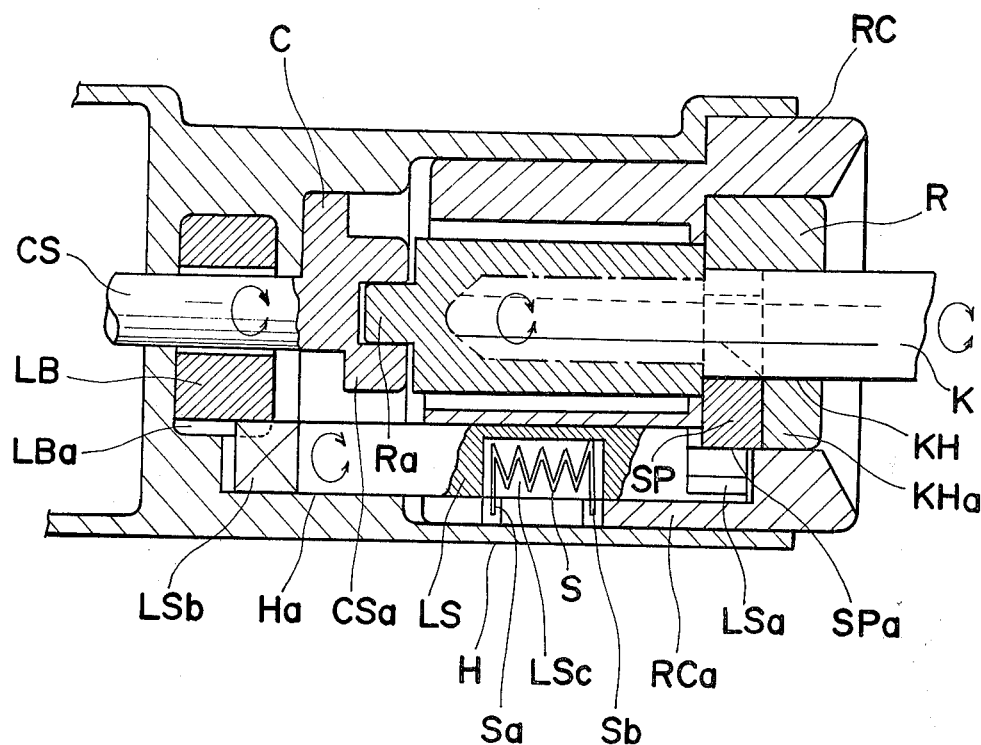
FIG. 1 is a longitudinal sectional view of a steering shaft locking device of a motor vehicle to which a cylinder lock of the present invention may be applied.

Referring now to the drawings, there is shown in FIG. 1, a steering shaft locking device of a motor vehicle which was previously proposed by the present inventor and disclosed in U.S. patent application Ser. No. 32,105 filed on Apr. 20, 1979, now U.S. Pat. No. 4,333,325, and to which the cylinder lock of the present invention may be applied.

The steering shaft locking device disclosed in the above described U.S. patent will be described briefly by way of example with reference to FIG. 1, hereinbelow. In FIG. 1, the locking device generally includes a housing H of key box having a cylindrical shape mounted on a steering shaft (not shown). Within the housing H, there is a rotor casing RC fixedly engaged in an opening therein disposed at one end of the housing H. In the rotor casing RC, a rotor R is rotatably mounted and is retained by a holding means such as a stop (not shown) in a known manner. Rotor R has a key hole KH and a plurality of tumblers (not shown) of a large diameter for receiving a key K therein.

Adjacent the inner end of the rotor R there is provided a cam shaft CS which is connected to the rotor R by coupling portions Ra and CSa so that the cam shaft CS rotates together with the rotor R as one unit upon rotation of the rotor R, whereby an ignition switch (not shown) of known construction is operated in a known manner.

In the housing, there is provided below the cam shaft CS a locking bar LB which is urged by a coil spring (not shown) in a direction for locking the steering shaft. The locking bar plunges from the free, unlocked position to the locking position in order to engage itself with the steering shaft, and prevents the rotation of the steering shaft. The locking bar has a follower portion LBa which is slidably engaged by the cam C of the cam shaft CS.

By the above arrangement, when the key K is inserted into the key hole KH of the rotor R and the rotor is rotated clockwise from the OFF position to the ON position, the ignition switch is operated and the locking bar LB is slidably retained against the coil spring at the unlocked position by the cam C on the cam shaft CS, and when the rotor R holding the key K is rotated counterclockwise to return to the OFF position, the locking bar LB is stopped and held at the unlocked position by a locking shaft LS. Then, when the key K is withdrawn from the key hole KH of the rotor R, the locking shaft is disengaged from the locking bar LB and the locking bar is released from the OFF position and is caused to slide into the locking position by the urging force of the coil spring.

It is to be noted that the cylinder lock of the present invention is designed to further simplify the structure and improve the operational reliability of the above described steering shaft locking device for motor vehicles and the like.

Figure 2:
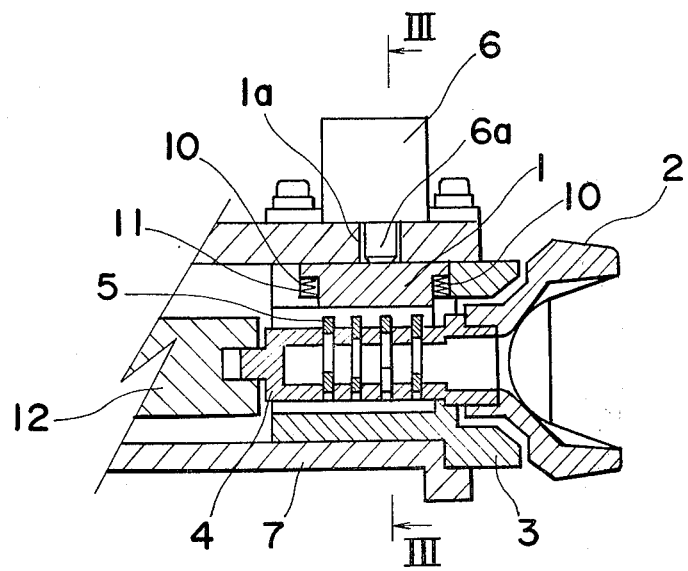
FIG. 2 is a longitudinal sectional view of a cylinder lock according to one preferred embodiment of the present invention.
Figure 3:
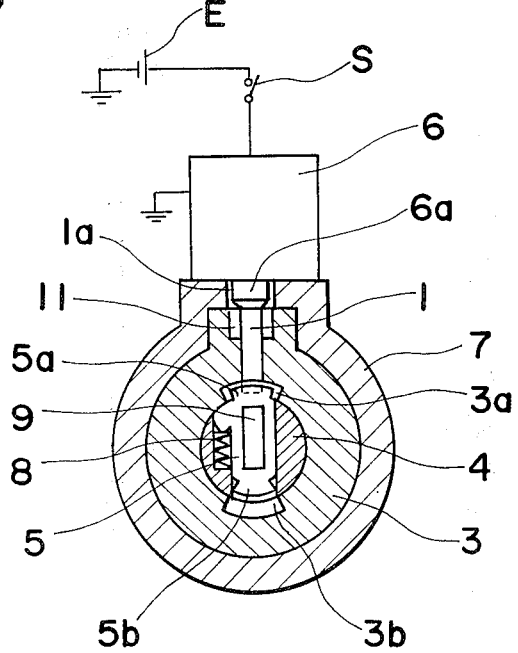
FIG. 3 is a cross-sectional view taken along the line III—III in FIG. 2.

As shown in FIGS. 2 and 3, the cylinder lock of the present invention generally includes a rotor casing 3 fixedly provided in a housing 7 of the steering shaft locking device and a rotor 4 which has a knob 2 fixedly provided on the outer end of the rotor 4 and is rotatably received in the rotor casing 3. The rotor casing 3 has grooves 3a and 3b on diametrically opposite parts of the inner surface of the rotor casing 3 and extending parallel with the axis of the rotor, and tumblers 5 each having a projecting end 5a are fitted into the rotor 4 so as to be slidable in the radial direction of the rotor 4 and spaced a predetermined distance from each other in the axial direction of the rotor 4 so that the cylinder lock can be selectively locked and unlocked by engagement and disengagement of the projecting ends 5a with the groove 3a. The portion 5b of the tumbler 5 escapes into the groove 3b when the key is inserted into or withdrawn from the key hole.

Each tumbler 5 is urged in one radial direction of the rotor 4 at all times by a spring 8 and the projecting end 5a of each tumbler 5 is fitted into the groove 3a of the rotor casing 3 so as to prevent the rotation of the rotor 4 so that the cylinder lock is locked when a key (not shown) is withdrawn from a key hole 9 formed in the rotor 4.

Furthermore, a tumbler blocking member 1 is inserted into an elongated through-opening 11 which is formed in a side wall of the rotor casing 3 and which extends parallel to the axial direction thereof and which communicates with the groove 3a of the rotor casing 3. The tumbler blocking member 1 is slidable in one radial direction of the rotor casing 3 and is urged outwards in the above-described radial direction at all times by springs 10 disposed at opposite axial ends of the elongated through-opening 11.

A solenoid 6 having a plunger 6a is mounted at a predetermined position on the outer circumference of the housing 7 of the steering shaft locking device so as to be connected, through a switch S, to a power source E, and the plunger 6a is in contact with the tumbler blocking member 1 through a hole 1a formed in the housing 7. The plunger 6a is normally retracted as shown but is thrust towards the tumbler blocking member 1 so as to bias the tumblers 5 into their neutral position by the tumbler blocking member 1 so that the cylinder lock may be unlocked when the switch S is turned ON. It is to be noted that the switch S is provided, for example, on an instrument panel (not shown) of the motor vehicle. A transmission member 12 is connected with the rotor 4 so as to transmit the rotation of the rotor 4 to an ignition switch or a locking bar (not shown).

Hereinbelow the operation of the cylinder lock will be described. In the case when the cylinder lock is unlocked by using a key, the same operations as for ordinary cylinder locks are performed. Namely, the key is inserted into the key hole 9 of the rotor 4 so as to bias the tumblers 5 into their neutral position so that the rotor 4 can be rotated in a predetermined direction. Furthermore, in the case of the above-described steering shaft locking device, it is to be noted that unlocking of the cylinder lock and turning of the rotor leads to turning ON of the ignition switch, an accessory switch or a starter switch (not particularly shown).

On the other hand, where the cylinder lock is unlocked without the use of the key, the plunger 6a of the solenoid 6 is thrust towards the tumbler blocking member 1 by turning ON of the switch S so as to push the projecting end 5a of each tumbler 5 into the rotor 4, so that each tumbler 5 is biased into its neutral position and thus, the projecting end 5a of each tumbler 5 is disengaged from the groove 3a, whereby the rotor 4 can be rotated by the knob 2.

It is desirable that the switch S be of a keyboard type from a standpoint of prevention of theft of the motor vehicle so that said switch S may be turned ON only when an operational signal coincides with a stored signal.

As is clear from the foregoing description, the cylinder lock of the present invention applied to the steering shaft locking device of motor vehicles enables unlocking of the cylinder lock either by using a key or without using the key so as to rotate the rotor 4, offering a great convenience to users thereof.

Moreover, the cylinder lock of the present invention can also be applied to a trunk of motor vehicles.

Meanwhile, it is to be noted that the solenoid which is employed as the plunger driving device in the above-described embodiment may be replaced by other devices, for example, an electric motor or a mechanical device coupled with the plunger through a wire.

Furthermore, although the springs 10 for urging the tumbler blocking member 1 outwards in one radial direction of the rotor casing 3 are provided in this embodiment, the springs 10 can be eliminated and the springs 8 for urging the respective tumblers 5 in one radial direction of the rotor 4 can fulfill the role of the springs 10.

The cylinder lock of the present invention can be also applied to a house door as well as motor vehicles and the body 7 can be eliminated in that case.

In accordance with the present invention, the cylinder lock can be positively unlocked either by using a key or, without using the key, by the simplified arrangement in which the tumbler blocking member is received in one portion of the rotor casing and the plunger of the plunger driving device is brought into contact with the tumbler blocking member so as to bias the tumblers into their neutral position so that the rotor can be rotated in the rotor casing.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A cylinder lock which can be unlocked either by using a key or without using a key, said cylinder lock comprising:

a rotor casing having a groove in the inner surface of a side wall of said rotor casing and extending parallel to the axis of said casing, and further having an elongated through opening in the side wall of said rotor casing communicating with said groove;

a rotor rotatably received in said rotor casing and having a keyhole therein and having a knob fixedly provided on the outer end thereof;

tumblers slidably fitted into said rotor and having projecting ends selectively engaged in and disengaged from said groove when a key is withdrawn from and inserted into said keyhole, respectively;

a tumbler blocking member slidably positioned in said elongated through-opening in said rotor casing;

a plunger driving device mounted in a predetermined position on the outer surface of said side wall of said rotor casing and having a plunger driven thereby and opposed to said tumbler blocking member, whereby said tumblers are pushed into said rotor by said tumbler blocking member when said plunger is thrust towards said tumbler blocking member by said plunger driving device and said projecting ends of said tumblers are disengaged from said groove in said rotor casing for permitting said rotor to be turned by turning said knob.

2. A cylinder lock as claimed in claim 1 further comprising spring means urging said tumblers toward engagement of said projecting ends in said groove and urging said tumbler blocking member radially outwardly of said rotor casing toward said plunger.

3. A cylinder lock as claimed in claim 2 in which said spring means comprise first springs engaged with said tumblers for urging said tumblers and second springs engaged with said tumbler blocking member for urging said tumbler blocking member.

4. A cylinder lock as claimed in claim 1, wherein said plunger driving device is a solenoid.

5. A cylinder lock as claimed in claim 1, wherein said plunger driving device is an electric motor.

6. A cylinder lock as claimed in claim 1, wherein said plunger driving device is a mechanical device coupled with the plunger by a wire.

* * * * *